United States Patent Office 3,541,089
Patented Nov. 17, 1970

3,541,089
METHOD OF PREPARING CHAIN-SUBSTITUTED TRIMETHINE INDOLE DYESTUFFS
Donald W. Heseltine and John D. Mee, Rochester, N.Y., assignors to Eastman Kodak Company, Rochester, N.Y., a corporation of New Jersey
No Drawing. Continuation-in-part of application Ser. No. 676,602, Oct. 19, 1967. This application July 22, 1968, Ser. No. 746,252
Int. Cl. C09b 23/06
U.S. Cl. 260—240.65         14 Claims

ABSTRACT OF THE DISCLOSURE

Chain-substituted trimethine indole dyes are prepared by reacting an indole with an acid and an acrolein of the formula $$R-C=CH-CHO$$
$$|$$
$$Z$$

wherein R represents the desired substituent and Z represents a halogen atom.

---

This application is a continuation-in-part of our U.S. patent application Ser. No. 676,602 filed Oct. 19, 1967, and entitled "Dye Preparation" now abandoned.

This invention relates to certain cyanine dyes, and more particularly to a novel and improved method for their preparation.

Trimethine indole dyes having a substituent in the 8-position (i.e., the α-position on the trimethine chain) are known to be valuable electron acceptors and spectral sensitizers for direct positive photographic silver halide emulsions. However, the methods proposed for the production of dyes of this class have involved a multiplicity of steps making such methods laborious and costly. For example, M. Coenen et al., U.S. Pat. No. 2,930,694 issued Mar. 29, 1960, describes the preparation of a number of trimethine indole dyes having a substituent in the 8-position comprising several steps including the isolation of each of the intermediates produced in the respective steps. The above process is illustrated by the following reaction steps for the preparation of a typical dye:

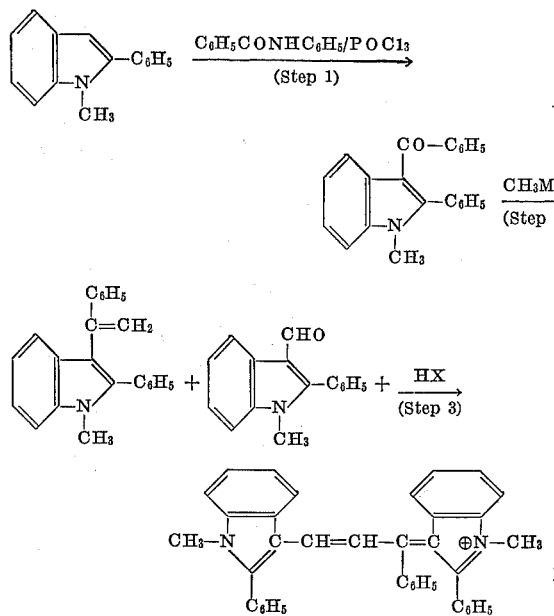

wherein X is an acid anion, e.g., chloride, bromide, iodide, perchlorate, p-toluenesulfonate, sulfamate, methyl sulfate, etc. It would, therefore, be highly advantageous to provide a less cumbersome means for preparing these valuable trimethine indole dyes.

We have now made the discovery that trimethine indole dyes having a substituent in the 8- or 10-position can be readily prepared by a novel single step process which avoids the disadvantages of prior art processes such as mentioned above, and which is very much more convenient and economical in operation.

It is, accordingly, an object of this invention to provide a new and improved process for preparing trimethine indole dyes having a substituent in the α-position on the trimethine chain.

Another object of this invention is to provide a new and improved process for preparing trimethine dyes having an aryl substituent in the α-position on the trimethine chain.

Other objects of this invention will be apparent from this disclosure and the appended claims.

In accordance with this invention a novel and improved process is provided for preparing trimethine indole dyes represented by the following general formula:

I. 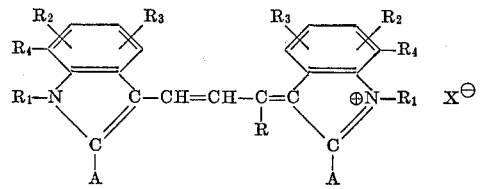

which comprises reacting a mixture of (1) an indole having the formula:

II. 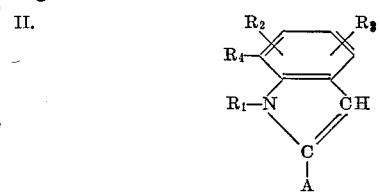

(2) an acrolein having the formula:

III.       $R-C=CH-CHO$
                                        $|$
                                        $Z$ and (3) a strong acid of the formula:

IV.                HX.

Preferably the acid used herein has a pKa of less than 4.0. Particularly useful are the mineral acids (e.g., hydrobromic acid, perchloric acid, and the like) and organic sulfonic acids (such as p-toluene sulfonic acid, methane sulfonic acid, etc.).

In the above Formulas I to IV, A represents a substituent such as an aryl group, e.g., phenyl, tolyl, chlorophenyl, methoxyphenyl, 3,4-dichlorophenyl, naphthyl, etc., or a heterocyclic group containing from 5 to 6 atoms wherein the heteroatom is selected from nitrogen, sulfur, selenium or oxygen, e.g., 2-, 3-, or 4-pyridyl, 2-furyl, 2-thienyl, etc. (including their quaternary salts such as 3-pyridyl methobromide, 4-pyridyl methiodide, etc.); $R_2$ and $R_3$ each represents a substituent such as hydrogen, an alkyl group preferably containing from 1 to 4 carbon atoms, e.g., methyl, ethyl, propyl, isopropyl, butyl, hexyl, decyl, etc., or a halogen atom, e.g., chlorine or bromine, and taken together, the atoms necessary to complete a fused non-heterocyclic aromatic ring having 6 carbon atoms, e.g., a fused benzene ring; $R_1$ represents an alkyl group (including substituted alkyl) and preferably containing from about 1 to 8 carbon atoms, such as methyl, ethyl, propyl, isopropyl, butyl, octyl, decyl, etc., a sulfoalkyl group such as sulfopropyl or sulfobutyl, a sulfatoalkyl group such as sulfatopropyl or sulfatobutyl, or a carboxyalkyl group such as carboxyethyl or carboxybutyl; $R_4$ represents a substituent selected from the values given for $R_2$ and, taken together with $R_1$, an alkylene bridge such as trimethylene or dimethylene; X represents an acid anion, preferably an anion such as chloride, bromide, iodide, p-toluenesulfonate, methyl sulfate, ethyl sulfate, perchlorate, etc.; R represents an alkyl substituent, preferably a lower alkyl group containing from 1 to 4 carbon atoms, e.g., methyl, ethyl, propyl, isopropyl, butyl, hexyl, decyl, etc., or an aryl group, e.g., phenyl, tolyl, naphthyl, methoxyphenyl, nitrophenyl, etc., or a thienyl group, or an indolyl group, and the like; and, Z represents a halogen atom, e.g., chlorine or bromine. Preferably, the reaction is conducted using proportions of about 2 moles of (1) indole, 1 mole of (2) acrolein and about 1-2 moles of (3) acid, in an inert solvent medium such as glacial acetic acid. Strong acids represented by HX, wherein X⁻ is as previously defined, include hydrobromic acid, perchloric acid, etc. The reaction can be carried out over a relatively wide range, e.g., 15–60° C., and at variable pressures, but preferably at normal room temperatures and normal atmospheric pressures. The crude dye is then separated from the reaction mixture by filtration and purified by one or more recrystallizations from appropriate solvents such as methanol.

The trimethine indole dyes defined by Formula I above containing the desensitizing 2-aryl indole nuclei, as indicated previously, are powerful electron acceptors and spectral sensitizers for direct positive type photographic silver halide emulsions. They provide superior reversal systems, especially with fogged direct positive emulsions that are characterized by both good speed and desired sensitivity in the green to red region of the spectrum with maximum sensitivity occurring in most cases in the region of about 650–680 nm. The images produced with these dyes are clear and sharp, and of excellent contrast. The dyes containing the fused indole nuclei are especially efficacious desensitizing dyes for direct positive emulsions.

In addition, they are also useful desensitizers in photographic silver halide emulsions, including those used in the process described in Stewart and Reeves, U.S. Pat. No. 3,250,618, issued May 10, 1966.

The dye preparation of this invention can be conducted by a one step process. This is a considerable advantage over prior art methods of preparing chain-substituted trimethine indole dyes, which have required several steps. The novel process of the invention is economical.

The dyes prepared by the present invention are especially useful in sensitizing silver halide emulsions to red radiation. They can be employed in photographic silver halide emulsions utilized in photographic elements designed for color photography, as well as in panchromatically sensitized silver halide emulsions designed for black-and-white photography.

In accordance with the invention, the direct positive photographic silver halide emulsions are prepared by incorporating one or more of the dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of a metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$, and the like.

Useful concentrations of reducing agent and metal compounds (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, "fogged" refers to emulsions containing silver halide grains which produce a density of at least 0.5 when developed, without exposure, for 5 minutes, at 68° F. in developer Kodak DK–50 having the composition set forth below, when the emulsion is coated at a silver coverage of 50 mg. to 500 mg. per square foot.

DEVELOPER

|  | G. |
|---|---|
| N-Methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |

Water to make 1.0 l.

The dyes of this invention are highly useful electron acceptors in high speed direct positive emulsions comprising fogged silver halide grains and a compound which accepts electrons, as described and claimed in Illingsworth U.S. Pat. application Ser. No. 619,936, filed Mar. 2, 1967, now U.S. Pat. 3,501,307 granted Mar. 17, 1970, and titled "Photographic Reversal Materials (Case C)." The fogged silver halide grains of such emulsions are such that a test portion thereof, when coated as a photographic silver halide emulsion on a support to give a maximum density of at least about one upon processing for six minutes at about 68° F. in Kodak DK–50 developer, has a maximum density which is at least about 30% greater than the maximum density of an identical coated test portion which is processed for six minutes at about 68° F. in Kodak DK–50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter.

The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. Patent application Ser. No. 619,909, filed Mar. 2, 1967, now U.S. Pat. 3,501,306 granted Mar. 17, 1970, and titled "Direct Positive Photographic Emulsions (Case C)." Such grains advantageously have a rather uniform diameter frequency distribution, as described and claimed in Illingsworth U.S. Patent application Ser. No. 619,948, filed Mar. 2, 1966, now U.S. Pat. 3,501,305 granted Mar. 17, 1970, and titled "Photographic Reversal Emulsions (Case B)." For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pages 330–338. The fogged silver halide grains in such direct-positive photographic emulsions produce a density of at least 0.5 when developed without exposure for five minutes at 68° F. in Kodak DK-50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with these dyes include any of those prepared with hydrophilic colloids that are known to be satisfactory for dispersing silver halides, for example, emulsions comprising natural materials such as gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pats. 3,142,568; 3,193,386; 3,062,674 and 3,220,844, and include the water insoluble polymers of alkyl acrylates and methacrylates, acrylic acid, sulfoalkyl acrylates or methacrylates and the like.

The dyes, reducing agents and metal compounds described heretofore can be used with emulsions prepared, as indicated above, with any of the light-sensitive silver halide salts including silver chloride, silver bromide, silver chlorobromide, silver bromoiodide, silver chlorobromoiodide, etc. Particularly useful are direct positive fogged emulsions in which the silver salt is a silver bromoiodide comprising more than 50 mole percent bromide. Certain dyes of this invention are also useful in emulsions which contain color formers.

The emulsions described above may be coated on any suitable photographic support, such as glass, film base such as cellulose acetate, cellulose acetate butyrate, polyesters such as poly(ethylene terephthalate), paper, baryta coated paper, polyolefin coated paper, e.g., polyethylene or polypropylene coated paper, which may be electron bombarded to promote emulsion adhesion, to produce useful photographic elements.

The novel process of the invention is further illustrated by the following examples.

EXAMPLE 1

1,1'-dimethyl-2,2',8-triphenyl-3,3'-indolocarbocyanine perchlorate

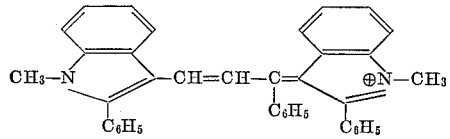

3-chloro-3-phenylacrolein (2.67 g., 1 mol.), prepared according to the general method described by Bodendorf and Mayer, Ber. 98, Nr. 11, 3554–60 (1965) is added to a stirred mixture of 1-methyl-2-phenylindole (4.1 g., 2 mols.), acetic acid (40 ml.) and 70% perchloric acid (1.7 ml., 2 mols.). The mixture is stirred at room temperature for 2½ hours, then the solid is collected and washed with ether. After one recrystallization from methanol acidified with HBr, the yield of purified dye is 3.41 g. (54%), M.P. 266–267° C., dec.

The above prepared dye containing the desensitizing 1-methyl-2-phenylindole nuclei is photographically tested by the procedure described in Example 2. The results indicate that this dye is a useful electron acceptor and spectral sensitizer for direct positive photographic emulsions.

The procedure of Example 1 is repeated, except that 1-methyl-2-(3-pyridyl)indole is substituted for the 1-methyl-2-phenylindole to obtain 1,1'-dimethyl-8-phenyl-2,2'-di-(3-pyridyl) - 3,3'-indolocarbocyanine perchlorate salt. When Example 1 is repeated using 3 - chloro - 3 - ethylacrolein, there is obtained 8-ethyl-1,1'-dimethyl-2,2'-diphenyl - 3,3' - indolocarbocyanine perchlorate. When 5-chloro-1-methyl-2-phenylindole or 5-ethyl - 1 - methyl-2-phenylindole is substituted for the 1-methyl-2-phenylindole in Example 1, there is obtained, respectively, 5,5'-dichloro-1,1'-dimethyl-2,2',8 - triphenyl-3,3'-indolocarbocyanine perchlorate and 5,5'-diethyl-1,1'-dimethyl-2,2',8-triphenyl-3,3'-indolocarbocyanine perchlorate. In a similar manner, 1-methyl-2-thienylindole can be substituted in Example 1 to obtain, respectively, and 1,1'-dimethyl-8-phenyl-2,2'-dithienyl-3,3'-indolocarbocyanine perchlorate.

EXAMPLE 2

1,1'-dimethyl-2,2',10-triphenyl-3,3'-benz[g]indolocarbocyanine bromide

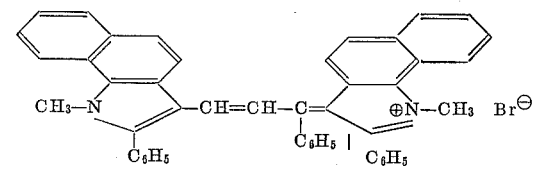

This dye is prepared in the manner described for Example 1, except that 1-methyl-2-phenylbenz[g]indole (2 mols.) and 48% HBr (2 mols.) are used in place of 1-methyl-2-phenylindole and 70% perchloric acid, respectively. After two recrystallizations from methanol acidified with HBr, the yield of purified dye is 27%, M.P. 190–192° C., dec.

The above prepared dye containing the desensitizing 1-methyl-2-phenylbenz[g]indole nuclei is photographically tested for its usefulness as an electron acceptor and spectral sensitizer for fogged direct positive photographic silver halide emulsions by the following procedure:

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye of the above example is then added to the above fogged emulsion in amount sufficient to give a concentration of 0.80 gram of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D-19 developer which has the following composition:

|   | G. |
|---|---|
| N-Methyl-p-aminophenol sulfate | 2.0 |
| Sodium sulfite (anhydrous) | 90.0 |
| Hydroquinone | 8.0 |
| Sodium Carbonate (monohydrate) | 52.5 |
| Potassium bromide | 5.0 |
| Water to make 1.0 liter. | | then fixed, washed and dried. The results are listed in Table 1 hereinafter. Referring thereto, it will be seen that the dye of this example has a maximum density in the unexposed areas of 1.93 and a minimum density in exposed areas of 0.06, a maximum sensitivity of 655 nm. and a relative speed of 832. This result indicates that the dye compound of the above example is well suited to function as both an electron acceptor and spectral sensitizer. It thus provides excellent quality direct positive photographic silver halide emulsions. Excellent magenta images are obtained when the color former 1-(2,4,6-trichlorophenyl)-3,3' - (2'',4''-di-t-amylphenoxyacetamido) benzimidazo-5-pyrazolone is incorporated in the emulsion of this example, the emulsion is coated on a support, exposed to a tungsten source through Wratten filter No. 61 and No. 16, and reversal processed as described in Graham et al. U.S. Patent 3,046,129, issued July 24, 1962, in Example (a) column 27, lines 27 et seq. except that black-and-white (MQ) development is omitted, the color development is reduced to one minute and is conducted in total darkness until after fixing.

EXAMPLE 3

8-(2-naphthyl)-2,2'-diphenyl-1,7,1',7'-ditrimethylene-3,3'-indolocarbocyanine perchlorate

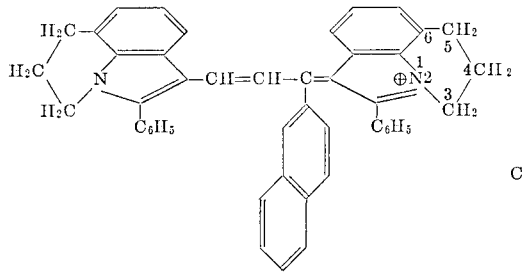

70% perchloric acid (0.9 ml. 1 mol.) is added to a stirred suspension of 2-phenyl - 1,7 - trimethyleneindole (2.33 g., 2 mols.) and 3-chloro-3-(2-naphthyl)acrolein (1.09 g., 1 mol.)[1] in acetic acid (25 ml.). The mixture is stirred overnight at room temperature, then the solid is collected and washed with methanol. After one recrystallization from methanol and acidified with HCl, the yield of purified dye is 1.14 g. (31%), M.P. 261° C., dec.

[1] Prepared according to Bodendorf and Mayer, Ber., 98, Nr. 11, 3554-60 (1965).

The above prepared dye containing the desensitizing 2-phenyl-1,7-trimethyleneindole nuclei is tested by the procedure described in above Example 2. The results as shown in Table 1 hereinafter indicate that this dye is an outstanding electron acceptor and spectral sensitizer for fogged direct positive photographic emulsions. The densities are 1.68 and 0.09 for the unexposed and exposed areas, respectively, with a maximum sensitivity at 675 nm. and a relative speed of 1380. It will be noted that the control containing no dye has a maximum density of 1.90 and a speed of <1, with no reversal.

EXAMPLE 4

1,1'-dimethyl-10-(2-naphthyl)-2,2'-diphenyl-3,3'-benz[g]indolocarbocyanine perchlorate

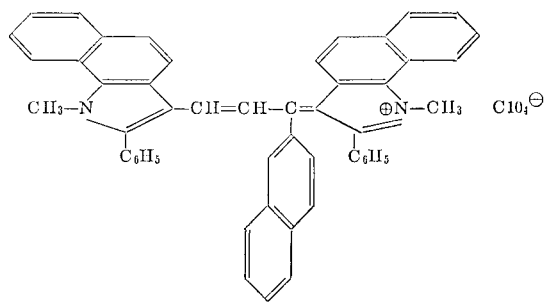

This dye is prepared in the manner described for Example 3, except that 1-methyl-2-phenylbenz[g]indole (2 mols.) is used in place of 2-phenyl-1,7-trimethyleneindole. After one recrystallization from m-cresol/methanol, the yield of purified dye is 77%, M.P., 240° C., dec.

The above prepared dye containing the desensitizing 1-methyl-2-phenylbenz[g]indole nuclei is tested by the procedure described in above Example 2. The results are recorded in Table 1 hereinafter. Referring thereto, it will be noted that the densities are 1.87 and 0.08 for the unexposed and exposed areas, respectively, with a maximum sensitivity at 660 nm. and a relative speed of 725. This result indicates that the dye of this example is an outstanding electron acceptor and special sensitizer with fogged direct positive emulsions.

The effectiveness of the trimethine indole dyes of the invention as electron acceptors and spectral sensitizers for fogged direct positive photographic emulsions, as determined by the test procedure described in above Example 2, is illustrated by the test results in the following table.

TABLE 1

| Dye of ex. no. | Dye concentration g./mole silver | Relative clear speed | Density Max. unexposed areas | Density Min. exposed areas | Sensitizing max. (nm.) |
|---|---|---|---|---|---|
| 2 | 0.80 | 832 | 1.93 | 0.06 | 655 |
| 3 | 0.80 | 1,380 | 1.68 | 0.09 | 675 |
| 4 | 0.80 | 725 | 1.87 | 0.08 | 660 |
| Control | 0.00 | <1 | 1.90 | | ([1]) |

[1] No reversal.

From the foregoing disclosures, it will be apparent that other trimethine indole dyes can be readily prepared by the novel process of the invention by appropriate selection of intermediates defined by Formulas II, III and IV above, and that these dyes likewise will function as effective electron acceptors and spectral sensitizers for direct positive photographic silver halide emulsions.

The following examples further illustrate the preparation of fogged, direct positive photographic emulsions and elements with the dyes of the invention.

EXAMPLE 5

To 9.0 pounds of a silver chloride gelatin emulsion containing an equivalent of 100 grams of silver nitrate is added 0.017 gram of 1,1'-dimethyl-2,2',10-triphenyl-3,3'-benz[g]-indolocarbocyanine bromide (Example 2).

The mulsion is coated on a non-glossy paper support, and is flashed with white light to give a density of 1.2 when developed in the following developer, diluted 1 part to 2 parts of water:

|  | Grams |
|---|---|
| N-methyl-p-aminophenol sulfate | 3.1 |
| Sodium sulfite, des. | 45 |
| Hydroquinone | 12 |
| Sodium carbonate, des. | 67.5 |
| Potassium bromide | 1.9 |

Water to 1 liter.

The light fogged material can be exposed to an image with light modulated by a Wratten No. 15 filter to give a direct positive image.

EXAMPLE 6

Seven pounds of a silver chloride gelatin emulsion containing the equivalent of 100 g. of silver nitrate is heated to 40° C. and the pH is adjusted to 7.8. Eight cc. of full strength (40%) formalin solution is added and the emulsion is held at 40° C. for 10 minutes. At the end of the holding period, the pH is adjusted to 6.0 and 0.125 g. of 8-(2-naphthyl)-2,2' - diphenyl - 1,7,1',7' - ditrimethylene-3,3'-indolocarbocyanine perchlorate is added (Example 3). The emulsion is coated on a support, and provides good direct positive images. Similar results are obtained when the dye of Example 4 is substituted for the above dye.

The photographic silver halide emulsion and other layers present in the photographic elements made with the dyes of the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al. U.S. Pat. 2,322,027, issued June 15, 1943, Fierke et al. U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A process for preparing a trimethine indole dye represented by the following general formula:

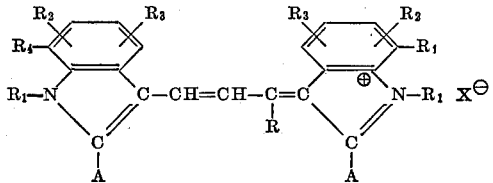

which comprises reacting a mixture comprising (1) an indole represented by the formula:

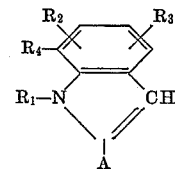

(2) an acrolein represented by the formula:

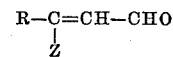

and (3) a strong acid represented by the formula:

HX wherein in said formulas A represents a substituent selected from the group consisting of phenyl, a tolyl group, a naphthyl group, a pyridyl group, a furyl group, and a thienyl group, $R_2$ and $R_3$ each represents a substituent selected from the group consisting of hydrogen, an alkyl group containing from 1 to 10 carbon atoms, halogen and, taken together, the atoms necessary to complete a fused benzene ring; $R_1$ represents a member selected from the group consisting of alkyl having from 1 to 10 carbon atoms, a sulfoalkyl group containing from 1 to 4 carbon atoms in the alkyl moiety, a sulfatoalkyl group containing from 1 to 4 carbon atoms in the alkyl moiety and a carboxyalkyl group containing from 1 to 4 carbon atoms in the alkyl moiety; $R_4$ represents a substituent selected from the values given for $R_2$ and, taken together with $R_1$, an alkylene bridge having from 2 to 3 carbon atoms; X represents the anion of an acid having a pKa of less than 4.0; R represents a substituent selected from the group consisting of alkyl having from 1 to 10 carbon atoms, phenyl, a tolyl group, a naphthyl group, a thienyl group and an indolyl group; and, Z represents a halogen atom.

2. The process as defined by claim 1 wherein said reaction components are present in said mixture in the proportions of about 2 moles of said indole, about 1 mole of said acrolein and about from 1 to 2 moles of said acid.

3. The process as defined by claim 2 wherein said indole is selected from the group consisting of a 1-alkyl-2-arylindole, a 1-alkyl-2-arylbenz indole and a 2-aryl-1,7-trimethyleneindole.

4. The process as defined by claim 3 wherein said acrolein is a 3-chloro-3-acrylacrolein.

5. The process as defined by claim 3 wherein said acid is selected from the group consisting of hydrobromic acid and perchloric acid.

6. The process as defined by claim 3 wherein said reaction is carried out in glacial acetic acid.

7. The process for preparing a 1,1'-dimethyl-2,2',8-triphenyl-3,3'-indolocarbocyanine salt which comprises reacting a mixture of about 2 moles of 1-methyl-2-phenylindole, about 1 mole of 3-chloro-3-phenylacrolein, and about from 1 to 2 moles of an acid HX wherein $X^\ominus$ represents an acid anion.

8. The process as defined by claim 7 wherein said salt is the perchlorate salt and wherein said HX is perchloric acid.

9. The process for preparing a 1,1'-dimethyl-2,2',10-triphenyl-3,3'-benzindolocarbocyanine salt which comprises reacting a mixture of about 2 moles of 1-methyl-2-phenylbenzindole, about 1 mole of 3-chloro-3-phenylacrolein, and about 1 to 2 moles of an acid HX wherein $X^\ominus$ represents an acid anion.

10. The process as defined by claim 9 wherein said salt is the bromide salt and wherein said HX is hydrobromic acid.

11. The process for preparing an 8-(2-naphthyl)-2,2'-diphenyl-1,7,1',7'-ditrimethylene-3,3' - indolocarbocyanine salt which comprises reacting a mixture of about 2 moles of 2-phenyl-1,7-trimethyleneindole, about 1 mole of 3-chloro-3-(2-naphthyl)acrolein, and about from 1 to 2 moles of an acid HX wherein X⊖ represents an acid anion.

12. The process as defined by claim 11 wherein said salt is the perchlorate salt, and wherein said HX is perchloric acid.

13. The process for preparing a 1,1'-dimethyl-10-(2-naphthyl)-2,2'-diphenyl-3,3'-benzindolocarbocyanine salt which comprises reacting a mixture of about 2 moles of 1-methyl-2-phenylbenzindole, about 1 mole of 3-chloro-3-(2-naphthyl)acrolein, and about from 1 to 2 moles of an acid HX wherein X⊖ represents an acid anion.

14. The process as defined by claim 13 wherein said salt is the perchlorate salt and said HX is perchloric acid.

References Cited

UNITED STATES PATENTS 2,930,694  3/1960  Coenen et al. ___ 260—240.6 XR

OTHER REFERENCES

Majer, Tetrahedon, vol. 9, pages 106 to 110 (1960).

JOHN D. RANDOLPH, Primary Examiner

U.S. Cl. X.R.

96—106; 260—283, 286, 294.8, 295, 296, 319.1, 326.12, 326.13, 326.16